Inventors: James D. Thorn and
Anthony V. G. Jackman; by
Baldwin & Wight, Attys.

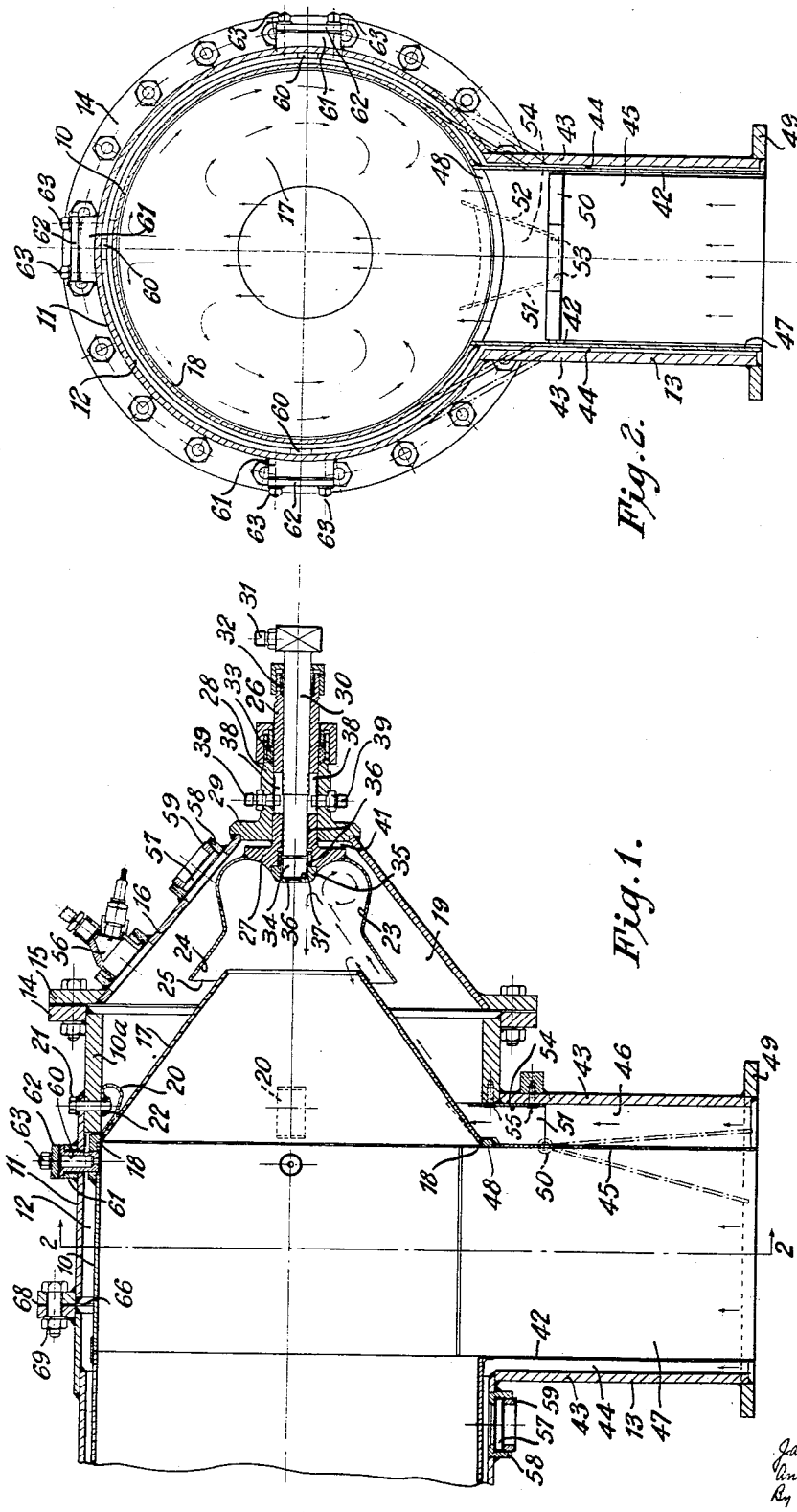

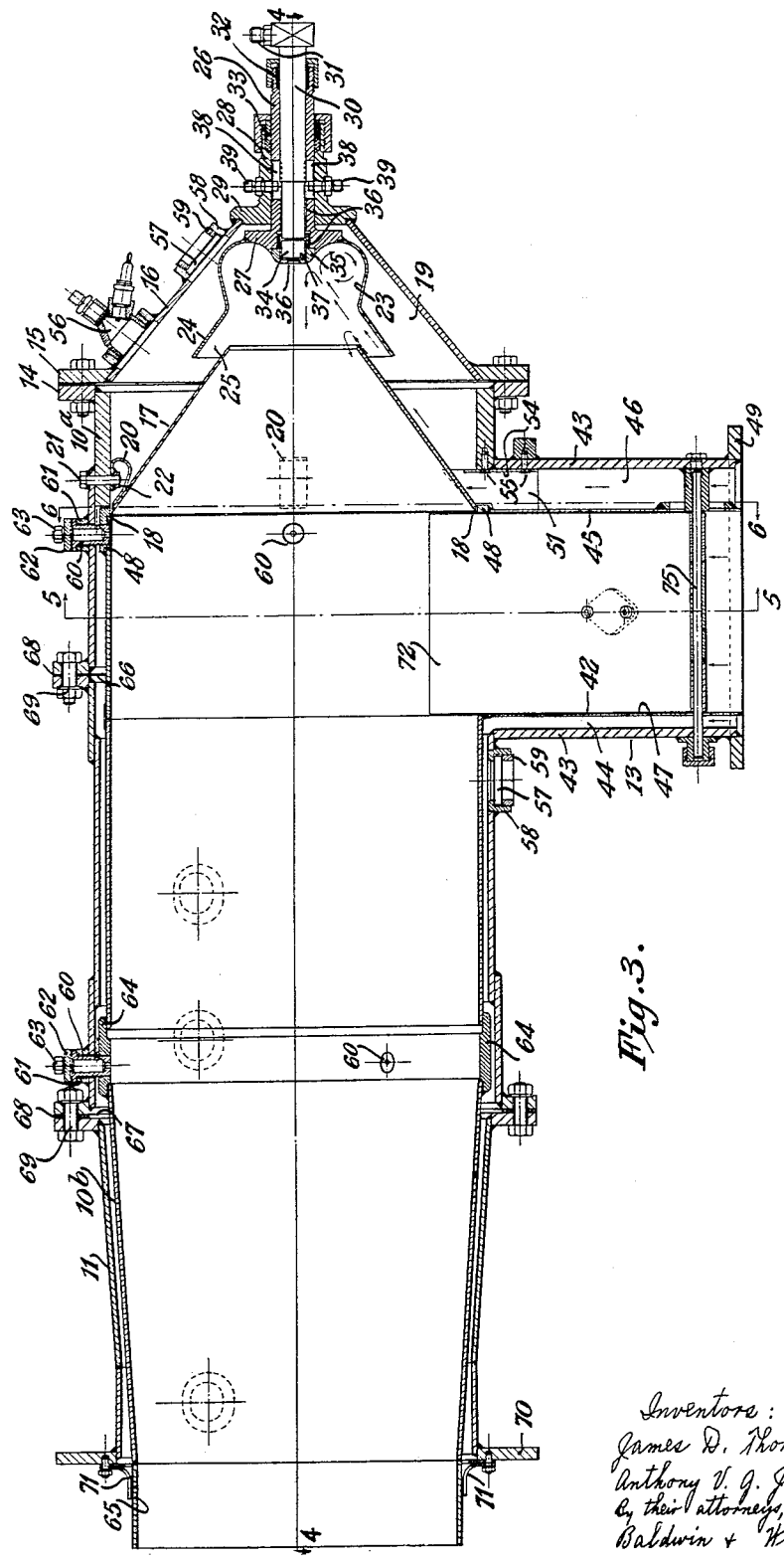

Aug. 23, 1955

J. D. THORN ET AL 2,715,816

COMBUSTION CHAMBER FOR USE WITH
INTERNAL COMBUSTION TURBINES

Filed May 5, 1952

Inventors:
James D. Thorn and
Anthony V. G. Jackman;
By their attorneys,
Baldwin & Wight

2,715,816

COMBUSTION CHAMBER FOR USE WITH INTERNAL COMBUSTION TURBINES

James Douglas Thorn and Anthony Victor George Jackman, Waterside South, Lincoln, England, assignors to Ruston & Hornsby Limited, Waterside South, Lincoln, England, a company of Great Britain Application May 5, 1952, Serial No. 286,056

8 Claims. (Cl. 60—39.65)

This invention relates to combustion chambers in which fuel is burnt in air delivered thereto under pressure to produce hot combustion gases, and more particularly to combustion chambers of the elbow type adapted for use with internal combustion turbines and comprising essentially an elongated shell having a concave interior surface and a rearwardly tapered or coned rear end or head within which is mounted a primary combustion chamber consisting of a rear bowl portion flared at the front end where it overlaps the rear of a tapered or coned front portion or inner cone which extends forwardly into the combustion chamber and is separated from the coned head by an annular space in continuous communication with the bowl where the front end of the latter overlaps the inner cone, one or more fuel injectors or atomisers projecting into the rear of the primary combustion chamber, and an inlet conduit or duct for air under pressure disposed transversely to the combustion chamber with its opening projecting over the front portion of the inner cone and dimensioned so as to produce vortices in the combustion chamber the front end of which serves as the outlet for the combustion gases.

Combustion chambers of this type as hitherto constructed are usually enclosed by a corresponding insulating casing. The primary combustion bowl which is of cylindrical form and the inner cone are constituted by a casting supported from the said coned rear end by circumferentially spaced vanes and provided with an annular series of slots where the flared end of the bowl portion overlaps the exterior of the inner cone, the inlet conduit for the compressed air being of circular cross-section so that some of the air under pressure serves as primary air as it is directed against the projecting nearer or lower portion of the exterior surface at the front end of the inner cone and finds its way through said slots into the primary combustion bowl to produce therein a ring vortex which is replenished continuously, and air and combustion mixture flow from the centre of the ring upstream, whilst the bulk of the air under pressure, which serves as secondary air, strikes against the concave interior of the wall of the combustion chamber and swirls laterally outwards to form two vortices of opposite hand.

The principal objects of the present invention are to improve the construction and operation of combustion chambers of the above type to ensure stable or continuous combustion in the primary combustion chamber, to reduce pressure losses in the combustion gases, and provide a combustion chamber which will be relatively cooler in operation than known combustion chambers of the above type and furthermore will permit a large variety of fuels, particularly low grade fuel oils, to be consumed economically.

According to one feature of the present invention, the inlet for compressed air which may be of rectangular cross-section is disposed preferably at right angles to the axis of the combustion chamber and contains a partition which extends to the large end of the inner cone and thus divides the inlet into two separate ducts, one for primary air in open communication with the annular chamber about the inner cone and the other for secondary air in open communication with the combustion chamber, the inlet for primary air being provided with two spaced vanes which are arranged in the direction of the air flow and diverge towards the combustion chamber so that part of the primary air passes between the vanes to the nearer part of the annular chamber about the inner cone whilst the remainder passes between the vanes and the adjacent side walls of the duct and is directed by the former to pass over the remote part of said inner cone into the corresponding part of said annular chamber to provide a substantially even distribution of the air entering the primary combustion bowl through the communication between it and the said annular chamber about the inner cone.

According to another feature of the present invention, the longitudinal side walls of the inlet branch for the compressed air, diverge towards the combustion chamber and merge into the side walls of the cylindrical or otherwise curved shell thereof preferably tangentially and two vanes are mounted or pivoted at their upstream ends preferably about a common axis substantially parallel with the axis of the combustion chamber, in the duct of the inlet branch for secondary air, these vanes diverging towards the concave interior surfaces at the sides of the said cylindrical shell so that as secondary air passes through the inlet it is directed onto the said concave side portions of the shell whereby the two streams of air meeting on the walls of the combustion chamber will be directed inwardly to form two vortices therein.

Said vanes in the duct for secondary air may however be mounted at their upstream ends on spindles spaced apart and form a continuation of the side walls of a fixed V-shaped box like structure at said ends.

According to a modification, a single vane may be mounted within and at or towards one of the side walls of the duct for the inlet of secondary air, whereby the stream of air entering said duct will be directed onto one of the side walls of said duct and will follow the interior concave contour of the shell of the combustion chamber to form a single vortex therein.

The aforesaid vane or where two vanes are provided, may be pivoted at its or their upstream end or ends and may be provided with means for angular adjustment to control the proportional distribution of the inlet air between primary and secondary air quantities, to control the relative strength and shape of the vortex or vortices, the shape, position and length of the flame, and also provide a flow of relatively cool air between the flame and the walls of the combustion chamber.

According to another modification, in order to obviate restriction to the passage of air supplied to the primary combustion chamber, the side walls or the downstream ends at least of the side walls of the primary air inlet duct only, may diverge towards the combustion chamber and may be tangential to the side walls of the latter.

The primary combustion bowl is constructed separately from the inner cone and in the assemblage an annular space separates the interior surface of its flared front end from the adjacent exterior surface of the inner cone, so that the inlet or primary air passing over the latter enters the ignition bowl around its full perimeter.

The inner cone is preferably of slightly less external diameter at the base than the internal diameter of the combustion chamber and is removably mounted or supported therein at circumferentially spaced points at or near the base so that in addition to allowing for expansion, a space is provided for cooling air to flow over the adjacent interior surface of the combustion chambers.

The primary combustion bowl is preferably adjustable axially relatively to the inner cone to change the area of the annular inlet to the former primarily for varying the strength of the mixture in the primary combustion bowl and the fuel injector may be adjustable axially relatively to the combustion bowl.

A part of the partition in the inlet for compressed air may comprise a vane pivoted at a point downstream to vary the intake of compressed air into the primary air duct leading to the annular chamber about the inner cone.

In order to cool the fuel injector or sprayer and prevent the deposit of carbon about the fuel delivery nozzle, an annular lip is provided about and is spaced from the end of the nozzle and this gap communicates through a passage or passages with the space about the primary combustion bowl which is in open communication with the annular chamber about the inner cone or alternatively, compressed air from a separate source may be conducted to said gap through a convenient communicating passage or passages.

Referring now to the accompanying drawings:

Figure 1 is a sectional view taken through the axis of a portion of one form of combustion chamber constructed according to the present invention and showing in hidden lines, for convenience of illustration, a slightly modified construction.

Figure 2 is a sectional end view of the combustion chamber shown in Figure 1 taken on the line 2—2 thereof.

Figure 3 is a similar view to Figure 1 of a modified form of the combustion chamber shown in that figure, the full length of the chamber being illustrated.

Throughout the drawings similar parts of modified forms of the present invention will be designated by similar reference numerals.

Figure 4:
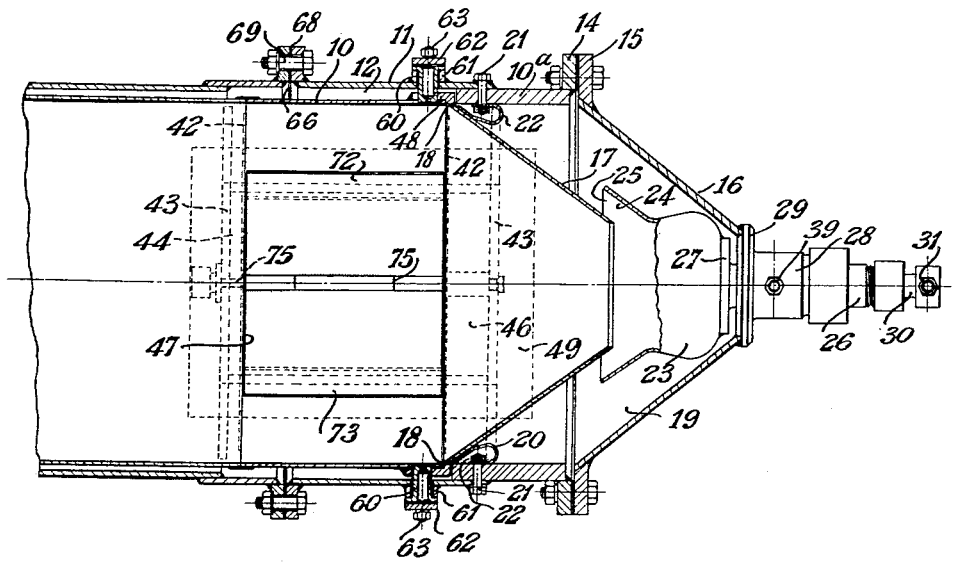
Figure 4 is a sectional view taken on the line 4—4 of Figure 3 of a portion of the combustion chamber.

In one form of the improved elbow combustion chamber as applied to a gas turbine power plant and as illustrated in Figs. 1 and 2, a main combustion chamber of welded construction and of essentially cylindrical form, the complete length of which is shown in Fig. 3 of the form of the invention illustrated in Figs. 3–6, comprises essentially a lining or inner shell 10 and a concentric outer casing or shell 11 of greater thickness or strength than the inner shell, separated from the lining by an insulating space or jacket 12 through which air under pressure may be circulated as hereinafter more particularly described or which may be packed with a filling of heat insulating material through which air under pressure may be circulated.

The said insulating space 12 extends from the front end of the combustion chamber to a transverse plane a predetermined distance from the rear of the air inlet branch 13 whilst the remainder or rear portion of the cylindrical combustion chamber is unjacketed and comprises a single cylindrical shell 10a, all as illustrated in Fig. 1. The rear end of this portion of the combustion chamber is flanged at 14 and is bolted to a corresponding flange 15 at the front end of a frustro-conical rear end portion or head 16 having walls of substantial thickness. The rearwardly-inwardly tapered frustro-conical inner member 17, hereinafter referred to as the inner cone, which is of similar conicity to the rear end portion 16 is preferably slightly less in external diameter at its base or front end than the internal diameter of the cylindrical inner shell 10 of the main combustion chamber to provide a narrow annular space 18 (see particularly Fig. 2). The transverse plane through the rear end of the insulating space 12 coincides with or closely approaches a transverse plane through the base of the inner cone 17 so that said inner cone in effect forms a continuation of the inner shell 10. Said inner cone 17 is located near its base within the cylindrical combustion chamber so that it is positioned a predetermined distance from the rear frustro-conical end 16 thereof to provide an annular space 19 about it within said rear end of the main combustion chamber. The inner cone 17 is located at three points spaced 90° angularly apart one at each side of the main combustion chamber and the third at the part thereof opposite the air inlet branch 13. The locating means comprise flexible supporting clips 20 of the form illustrated in Fig. 1 one end of each of which is welded to the exterior of the inner cone 17 whilst the other end conforms to the contour of the cylindrical shell 10a and is secured thereto by a bolt 21 and nut 22.

The primary combustion bowl member 23 is of substantially thistle shape and is mounted in the coned rear end portion or head 16 of the main combustion chamber with its axis coincident with the axis of the latter and with its flared forward end 24 overlapping or surrounding the rear end of the inner cone 17 but spaced evenly therefrom with clearance around the full perimeter of the latter to provide an annular clearance, opening or communicating passage 25 between the annular space 19 and the primary combustion bowl 23. An axial and rearwardly extending inner sleeve 26 having at its forward end a flange 27 which is welded to and forms part of the rear wall of the primary combustion bowl 23 is slidably mounted in an outer sleeve 28 also having at its front end a flange 29 which is welded to the narrow end of the frustro-conical rear end or head 16 of the main combustion chamber and forms the rear end wall thereof. Within the inner sleeve 26 a fuel injector 30 of any suitable known form is mounted. A union 31 screwed into a tapped hole in the flanged outer end of the fuel injector is connected to a pipe through which fuel oil is conducted to the injector. The inner sleeve 26 projects beyond the outer one and suitably packed screwed glands 32 and 33 are provided at the ends of the sleeves 26 and 28 to provide fluid tight joints between the periphery of the fuel injector body and the inner sleeve 26 on the one hand and between the inner and outer sleeves 26 and 28 respectively on the other hand. The nozzle cap nut 34 and the forward portion of the injector body are of slightly less cross-sectional area than the remainder of the injector body. A cap 35 having the same internal diameter as that of the inner sleeve 26 is screwed axially into the flange 27 of the latter from the inside of the combustion bowl 23 and encloses the delivery end of the nozzle except for a central opening rather larger than the central delivery orifice, the construction and arrangement being such that a narrow gap 36 is provided between the exterior surfaces of the nozzle cap nut 34 and the forward portion of the injector body and the interior surfaces of the whole of the cap 35 and a portion of the inner sleeve 26. It will be noted that this gap not only encircles a portion of the injector body and the cylindrical surface of the nozzle cap nut 34 but extends between the end face of the nozzle and an annular lip 37 formed at the front of the cap 35, about the delivery orifice of the nozzle as illustrated in Fig. 1. The inner sleeve 26 is provided with longitudinal slots 38, which communicate with said gap 36. The longitudinal slots 38 communicate with tapped radial holes bored through the outer sleeve 28 and into which are screwed the ends of unions 39 connected to pipes for feeding air under pressure from a suitable source such as the compressor of the turbine plant so that air under pressure may pass continuously through said narrow gap 36 from which it enters the primary combustion bowl through the said central opening in the cap 35.

To vary the area of the annular opening 25 between the flared end 24 of the primary combustion bowl 23 and the rear of the inner cone 17, the gland 33 between the inner and outer sleeves 26 and 28 is loosened when axial movement can be imparted to the inner sleeve 26 and the primary combustion bowl 23 by sliding this sleeve with the fuel injector 30 carried by it, either inwardly or outwardly within the outer sleeve 28 either to reduce or enlarge the area of said annular opening 25 as required.

The axial position of the fuel nozzle in the rear end of the primary combustion bowl 23 can be readily adjusted by sliding the fuel injector 30 axially a short distance in one or other direction as may be required after first loosening the gland 32 and the gap 36 between the face of the nozzle and the annular lip 37 can be adjusted by correspondingly varying the axial position of the cap 35.

The air inlet branch 13 of the elbow combustion chamber is of rectangular and even cross-section throughout and has its axis at right angles to and intersects the axis of the cylindrical main combustion chamber 10 with its side walls parallel with a plane through the axis of the main combustion chamber as shown in Fig. 2. It consists essentially of an inner casing 42 which is welded to the inner shell 10 of the main combustion chamber and an outer casing 43 welded to the outer shell 11 of the main combustion chamber. Said casings 42 and 43 form an insulating space or jacket 44 in open communication with the jacket 12 about the inner shell 10 and extending as far as the rear end of the latter jacket, the remainder of the air inlet branch being constituted by the walls of the outer casing 43 of the jacket which form an unjacketed part of the air inlet branch 13. The wall 45 of the inner casing of the air inlet branch 13 lies in a transverse plane through the rear end of the inner shell 10 and forms a partition in said air inlet branch 13, which may extend to the side walls of the outer casing 43 of the jacket 44 and thus close the rear ends of that jacket. The partition 45 divides the air inlet branch 13 into two ducts 46 and 47 which are of different cross-sectional area, a narrow one 46 in open communication with the annular chamber 19 about the inner cone 17 for the admission of compressed air to the primary combustion bowl 23 in the manner indicated by the arrows shown in a portion of the combustion bowl illustrated in Fig. 1, and a wide one 47 in open communication with the inner shell 10 for the admission of secondary air thereto. The inner end of said partition 45 approaches the nearer portion of the convex exterior of the inner cone 17 at the base thereof and is welded to a supporting ring 48 for the rear end of the inner shell 10 of the main combustion chamber, which surrounds the base of said cone. For convenience of construction however the space between the side walls of the inner and outer casings 42 and 43 of the jacket 44 which is somewhat narrow as shown in Fig. 2, may be in open communication with the duct 46. Air under pressure from the compressor of the turbine plant passes through both ducts 46 and 47 of the air inlet branch 13 and the said jacket 44 by a conduit connected to the flanged end 49 of the air inlet branch 13. Some of the air passing through the jacket 12 may be admitted to the main combustion chamber at one or more selected points.

At a suitable point downstream such as 50 as illustrated in chain lines in Fig. 1, the partition 45 may be pivoted transversely with respect to the main combustion chamber so that it forms a flap which can be swung out of the plane of the remainder of the partition and is adapted to be adjusted by any suitable means to any required inclined position to either side of that plane for varying the intake of compressed air into the primary air inlet 46. Two positions are shown in chain lines in Fig. 1.

Within the primary air inlet duct 46 two fixed vanes 51 and 52 are mounted adjacently in planes parallel with the axis of the cylindrical combustion chamber, both fixed vanes 51 and 52 being disposed above the pivot 50 of the flap part of the partition 45. The fixed vanes 51 and 52 extend from the partition 45 to the rear wall of the duct 46 as shown in Fig. 1 and are spaced apart at their upstream ends 53 (see Fig. 2) but diverge towards their opposite or downstream ends where they engage or approach the surface of the inner cone 17 and their surfaces may conform more or less to the contour of the nearer portion of said inner cone. As illustrated, the two vanes are integral with a rear wall 54 which is secured to the combustion chamber and the rear end wall of the air inlet duct 46 by screws 55 and thus hold the vanes firmly in position. Having regard to the size of the inner cone 17 at the small end, the said rear wall 54 may project a predetermined distance into the annular chamber 19 as illustrated in Fig. 1 and thus forms a ledge to meter the quantity of air passing between the vanes 51 and 52 and entering that part of the annular opening 25 between the inner cone 17 and the combustion bowl 23 at the nearer portion of the curvature of the inner cone 17. The manner in which the primary air is directed over the surface of the inner cone 17 is indicated by the arrows in Fig. 6 of the form of the invention illustrated in Figs. 3–6.

Those portions of the side walls of the inlet duct 46 for primary air adjacent the side walls of the main combustion chamber may be constructed so that they diverge towards the latter and merge into the side walls thereof tangentially as illustrated in chain lines in Fig. 2.

The proportions of the air inlet branch 13 relative to the cylindrical combustion chamber 10 and the disposition longitudinally thereof are such that the incoming air passing through the inlet duct 47 for secondary air strikes the remote concave interior surface of the cylindrical combustion chamber where it is forced to flow laterally over that surface in respect of a vertical plane containing the axis of the cylindrical combustion chamber to form vortices of opposite sense as indicated by the arrows in Fig. 2 and bring about a thorough co-mingling of this air with the combustion gases after expansion in passing through the inner cone.

A pilot igniter 56 is mounted in a hollow boss welded to the conical rear end 16 of the cylindrical combustion chamber and communicates with said annular chamber 19 about the inner cone.

Both the outer shell 11 of the main combustion chamber and the rear end or head 16 thereof may be fitted at suitable points such as 57 with sight glasses mounted in flanged hollow bosses 58 preferably welded to the walls of the main combustion chamber and said rear end or head 16 and removably held in position by retaining rings 59.

Referring now to the form of the present invention illustrated in Figs. 3–6, Fig. 3 shows the complete length of the main combustion chamber which is constructed as follows: The rear end of the cylindrical inner shell 10 is centred in the outer shell 11 by three cylindrical pins 60 spaced apart angularly 90° as illustrated more particularly in Figs. 5 and 6. These pins are hollow and are open at their inner ends as shown in Figs. 1, 3, and 4 for the admission of cooling air passing through the jacket 12. They are flanged at their outer ends and are mounted through said flanges which bear on hollow bosses 61 welded to the outer shell 11. The bodies of the pins 60 are passed through said hollow bosses 61 and their inner ends are fitted into holes bored through the supporting ring 48 for the rear end of the inner shell 10. The pins are held in position by clamping plates 62 bearing on their flanged heads through packing strips and secured to the outer shell 11 by studs 63. The front end of the cylindrical inner shell 10 is connected to an extension 10b which tapers slightly to suit the diameter of the conduit for leading the combustion gases to the turbine. The inner shell 10 and the extension 10b are connected together by a supporting ring 64 which is welded to the extension 10b but is slidably connected to the front end of the shell 10 to permit longitudinal expansion of the latter. Said ring is centred on the outer shell 11 to hollow pins 60 similar to those at the rear end of the inner shell 10. These pins are spaced 120° apart angularly. A short cylindrical portion 65 is welded to the end of the extension 10b and is passed into the conduit to which the front end of the combustion chamber is secured. The outer shell 11 comprises a welded construction built up of cylindrical and slightly conical sections so as to conform to the contour of the inner shell 10 and the extension 10b and is divided transversely by flanged joints at 66 and 67 having asbestos packing rings 68 and secured by an angular series of bolts 69 all as illustrated. The front end portion of the outer shell is cylindrical and an annular flange 70 thereon, by which the front end of the combustion chamber is secured to the conduit for conducting the combustion gases to the turbine, carries spring clips 71 which engage and give support to the cylindrical end portion 65 of the inner shell extension 10b.

The rear end of the combustion chamber is constructed precisely as in the form of the present invention described with reference to Figs. 1 and 2 of the accompanying drawings.

Figure 6:
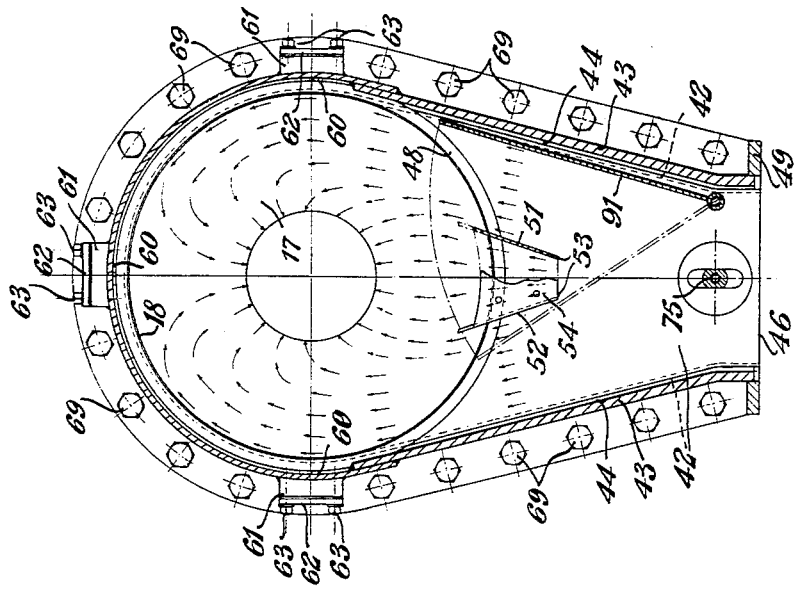
Figure 6 is a similar view to Figure 5 taken on line 6—6 of Figure 3 and showing a modified construction in chain lines for convenience of illustration.
Figure 5:
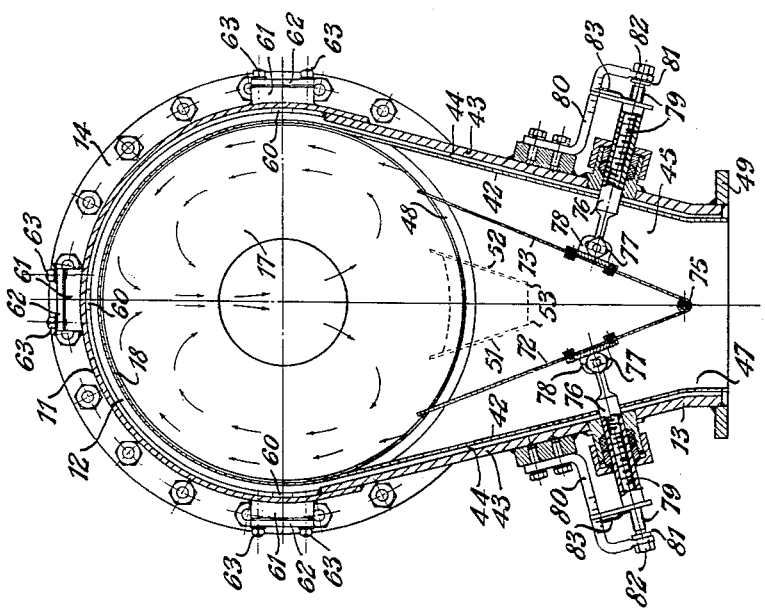
Figure 5 is a sectional end view taken on the line 5—5 of Figure 3.

The rectangular air inlet branch 13 has its lateral side walls diverging towards the cylindrical combustion chamber as illustrated in Figs. 5 and 6 so that they are tangential thereto; and within the duct 47 for admitting secondary air to the cylindrical combustion chamber, two adjacent vanes 72 and 73 are pivoted together at their upstream ends on a common spindle 75 parallel to the axis of the combustion chamber and each is fitted with a hollow adjusting rod 76 which is passed through a gland fitted to each inclined side wall of the air inlet branch 13. Each vane is adapted to be adjusted angularly independently to bring its free or downstream end nearer to or further from the adjacent inclined side wall of the air inlet branch. To that end each rod 76 is connected to its respective vane by a pin passed through the end of the rod and through a slot 77 in a bracket 78 secured to the vane. Each rod is hollow and is screw-threaded internally to accommodate an externally screw-threaded inner rod 79 which is screwed therein. The outer end of the rod 79 is located at the end of one limb of a substantially Z-shaped bracket 80 secured to the side walls of the air inlet branch 13 by screws as illustrated. The inner rod 79 is freely rotatable but is precluded from axial movement by a fixed collar 81 thereon and an end nut 82 adapted to be locked to the rod. By rotating said nut 82 in one or other direction the outer rod 76 will be moved axially in one or other direction as required. The outer end of the rod carries a pointer 83 which moves over a scale on the central limb of the Z-shaped bracket 80 which is parallel with the axis of the adjusting rod.

Figure 7:
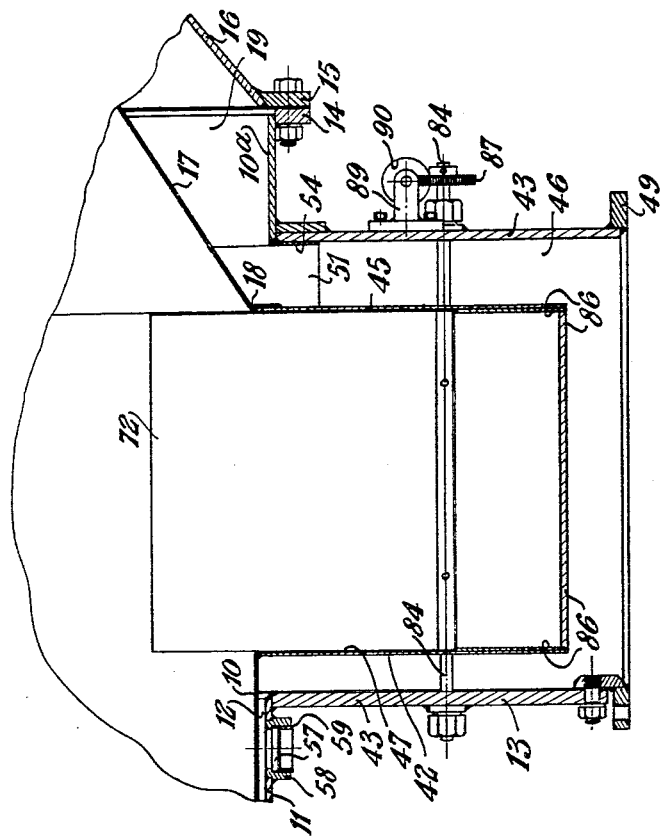
Figure 7 is a sectional view of the air inlet branch and a fragment of the combustion chamber showing modified means for adjusting the vanes in the duct for the supply of secondary air to the combustion chamber.
Figure 8:
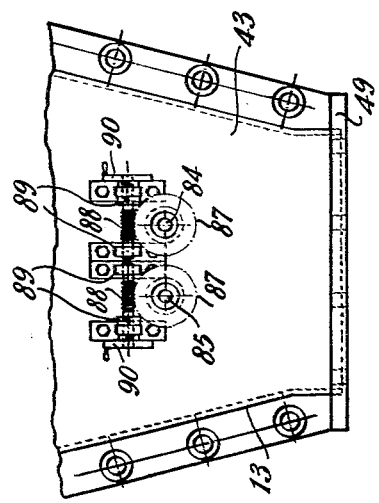
Figure 8 is a side view of a fragment of the air inlet branch illustrated in Figure 7 showing the means for adjusting the said vanes.

Accordingly to alternative means for actuating the vanes 72 and 73 as illustrated in Figs. 7 and 8, these vanes are fixedly mounted at their upstream ends on spindles 84 and 85 spaced apart with their lower ends forming a continuation of the sides of a fixed V-shaped box like structure 86. Each of these vanes is adapted to be swung in one or other direction by a worm wheel 87 mounted outside the air inlet branch 13 on the associated spindle and gearing with a worm 88 mounted in brackets 89 on one of the end walls of the air inlet duct 13. The spindle of each worm carries a controlling hand wheel 90. It will be clear that these means permit a fine and independent adjustment of each vane.

According to a modification of the form of the present invention illustrated in Figs. 3–6, a single vane 91 (see Fig. 6) may be pivoted at its upstream end within the duct 47 of the inlet air branch for secondary air at or towards one side wall thereof as illustrated and is adapted to be adjusted angularly towards or away from the opposite side wall of said duct by suitable means such as described above, whereby a single stream of air will pass over the latter side wall from which it will be directed inwardly around the concave wall of the combustion chamber to form a single vortex therein, the position of vane 91 determining the shape and size of the vortex produced.

In all forms of the present invention, the interior surfaces of the main and/or primary combustion chambers or parts of those surfaces as may be found necessary or desirable, may be lined with a suitable refractory material.

Although particular forms of the present invention have been described above, it is to be understood that the details of construction may be modified as desired without departing from the essential features of the present invention, for example, instead of the main combustion chamber being cylindrical, it may take the form in cross-section of two ellipsoids meeting in a central splitter edge.

We claim:

1. In a combustion chamber structure, an elongated shell having a concave interior surface defining a main combustion chamber, and a rearwardly-inwardly tapered head; means providing a primary combustion chamber and including an inner cone having its larger end extending forwardly into said main combustion chamber and its smaller end extending rearwardly into the front of said tapered head, and a bowl member mounted within said tapered head to extend forwardly and having its forward end flared and overlapping the rear end part of said inner cone with clearance, there being an annular space separating said inner cone and said tapered head which space is in communication with the interior of said bowl through said annular clearance; means for injecting fuel into the rear of said primary combustion chamber; and means for supplying air to said combustion chambers to support combustion therein comprising an inlet for compressed air disposed at an angle to the axis of said main combustion chamber, a partition in said inlet extending upwardly to the front end of said inner cone and dividing the inlet into two separate ducts, one of said ducts being in communication with said annular space for delivering primary air thereto and the other being in communication with said main combustion chamber for delivering secondary air thereto, and at least one vane in one of said ducts which is adapted to cause the air in said one of said ducts to take a predetermined path through the combustion chamber structure.

2. A combustion chamber as claimed in claim 1 comprising two spaced diverging vanes mounted in the other of said ducts which provides the inlet for primary air, said two spaced vanes diverging towards the main combustion chamber for causing part of the primary air to pass between said two spaced vanes to the nearest part of the annular space about the inner cone, and the remainder of said primary air to pass between said two spaced vanes and the adjacent walls of the said duct to the more remote part of said annular space, whereby a substantially even distribution of the air is caused to enter the said bowl through the clearance between said bowl and the annular space.

3. A combustion chamber as claimed in claim 1 in which the said means for supplying air to said combustion chambers is provided with longitudinal side walls which diverge towards the main combustion chamber and merge into the walls of the shell thereof, at least one vane being mounted in the duct for delivering secondary air, said last named vane being adapted to direct secondary air so that the stream of air entering said duct will be directed on to the interior concave contour of the shell to form a vortex therein.

4. A combustion chamber as claimed in claim 1 in which the said means for supplying air to said combustion chambers is provided with longitudinal side walls which diverge towards the main combustion chamber and merge into the side walls of the shell thereof, two vanes being disposed in the duct for delivering secondary air, said two vanes diverging towards the interior surface of the said shell so that as secondary air passes through said secondary air duct it is directed on to the said surface of the shell whereby two streams of air meeting on the walls of the main combustion chamber shell will be directed inwardly to form two vortices therein.

5. A combustion chamber as claimed in claim 4 comprising means for adjusting each of said two vanes angularly.

6. A combustion chamber as claimed in claim 1 in which the inner cone is of slightly less diameter at the base or forward end than the internal diameter of the main combustion chamber shell and is removably mounted or supported therein at circumferentially spaced points at or near its said base so that in addition to allowing for expansion of said inner cone, a space is provided for cooling air to flow over the adjacent interior surface of the main combustion chamber shell.

7. A combustion chamber as claimed in claim 1 in which the said bowl is adjustable axially relatively to the inner cone.

8. A combustion chamber as claimed in claim 1 in which the means for supplying air to said combustion chambers is provided with a pivoted flap constituting means for varying the intake of compressed air into the primary air inlet duct.

References Cited in the file of this patent

UNITED STATES PATENTS

| | | |
|---|---|---|
| 1,033,015 | Holzwarth | July 16, 1912 |
| 1,446,514 | Norris | Feb. 27, 1923 |
| 2,000,733 | Avery | May 7, 1935 |
| 2,214,568 | Thomas | Sept. 10, 1940 |
| 2,446,059 | Peterson et al. | July 27, 1948 |
| 2,458,066 | Farkas et al. | Jan. 4, 1949 |
| 2,458,497 | Bailey | Jan. 11, 1949 |
| 2,470,184 | Pfenninger | May 17, 1949 |
| 2,625,791 | Yellott | Jan. 20, 1953 |
| 2,651,913 | Hodgson | Sept. 15, 1953 |